(12) United States Patent
White et al.

(10) Patent No.: US 6,177,658 B1
(45) Date of Patent: Jan. 23, 2001

(54) THERMAL FILTER BLANKET

(76) Inventors: Jay P. White; Harvey H. White, Sr., both of 4812 Fuller Rd., Minden, LA (US) 71055

( * ) Notice: Under 35 U.S.C. 154(b), the term of this patent shall be extended for 0 days.

(21) Appl. No.: 09/472,465

(22) Filed: Dec. 27, 1999

(51) Int. Cl.⁷ .................................... H05B 3/58
(52) U.S. Cl. ................ 219/535; 123/549; 219/387; 219/202
(58) Field of Search .................. 219/202, 205, 219/535, 536, 386, 387, 549; 123/549, 557

(56) References Cited

U.S. PATENT DOCUMENTS

| | | |
|---|---|---|
| D. 316,942 | 5/1991 | Johnson .................. D6/611 |
| 2,498,983 | 2/1950 | D'Albora ................. 219/46 |
| 4,501,255 | 2/1985 | Van Der Ploeg ......... 123/557 |
| 4,675,503 * | 6/1987 | Toivio et al. ............ 219/205 |
| 5,408,068 * | 4/1995 | Ng .......................... 219/202 |
| 5,436,429 * | 7/1995 | Cline ....................... 219/202 |

FOREIGN PATENT DOCUMENTS

WO 88/01345  2/1988 (WO).

* cited by examiner

Primary Examiner—Teresa Walberg
Assistant Examiner—Shawntina Fuqua

(57) ABSTRACT

An electric blanket that can be wrapped around the fuel filter and powered by the automotive vehicle battery by means of a cigarette lighter adapter.

4 Claims, 1 Drawing Sheet

THERMAL FILTER BLANKET

BACKGROUND OF THE INVENTION

1. Field of the Invention

The present invention relates to an apparatus for warming an oil filter of an automotive vehicle.

2. Description of the Prior Art

Diesel fuel may contain paraffin residues and these residues may solidify in the fuel tank or filter system when the vehicle is idle during cold weather. The solidified residues can then clog the fuel filter system. Warming the fuel filter prior to starting the engine can reduce the chances of such clogging. U.S. Pat. No. 4,502,255 discloses an oil filter with an internal plate mounted within the filter housing for warming the oil in the filter. The prior art does not disclose a means for externally warming the fuel filter or for a device that can be easily applied to an existing fuel filter without the necessity of removing the fuel filter and modifying or replacing it with a filter with a built-in heating unit. The prior art also discloses food and beverage warmers employing a flexible jacket that can be electrically powered by a cigarette lighter adapter. The prior art also discloses seat warmers powered by a cigarette lighter adapter. The prior art does not teach the use of an electric blanket for warming a fuel filter.

A need exists for a fuel filter warmer that can be used when needed on an existing fuel filter without the need to remove or replace the filter and which can be manufactured inexpensively.

SUMMARY OF THE INVENTION

The present invention meeting the needs identified above is an electric blanket that can be wrapped around the fuel filter and powered by the automotive vehicle battery by means of a cigarette lighter adapter.

The foregoing and other objects, features and advantages of the invention will be apparent from the following more particular description of a preferred embodiment of the invention, as illustrated in the accompanying drawings wherein like reference numbers represent like parts of the invention.

DESCRIPTION OF PREFERRED EMBODIMENTS

Figure 1:
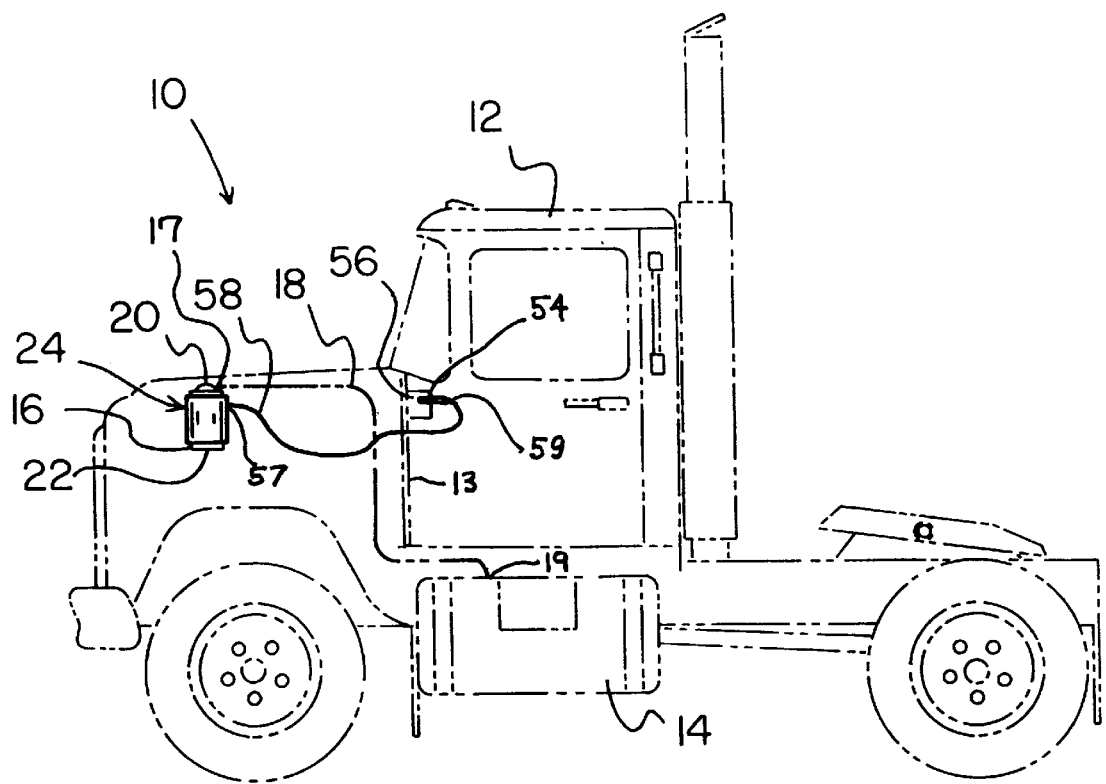
FIG. 1 is a side view of a typical vehicle showing the location of the device.

In FIG. 1, truck 12 has tank 14 connected to filter 16 by fuel line 18. Filter 16 has bottom 22 and top 20. Fuel line 18 has first end 17 connected to top 20 and second end 19 connected to tank 14. Blanket 24 is wrapped around filter 16. Cable 58 has blanket end 57 fixedly or removably engaged to blanket 24 and outlet end 59 connected to cigarette lighter adapter 54. Cigarette lighter adapter 54 is adapted for insertion into standard cigarette lighter component 56 of truck 12. Persons skilled in the art know that a cigarette lighter adapter allows current to be drawn from the vehicle battery through the vehicle's cigarette lighter fixture which is usually located on the dashboard but may be located elsewhere in the cab of the vehicle. Cable 58 is shown running through the firewall 13 of truck 12. Alternatively, cable 58 may be run outside of the vehicle and through the window of truck 12 into the cab for insertion of cigarette lighter adapter 54 into cigarette lighter 56.

Figure 2:
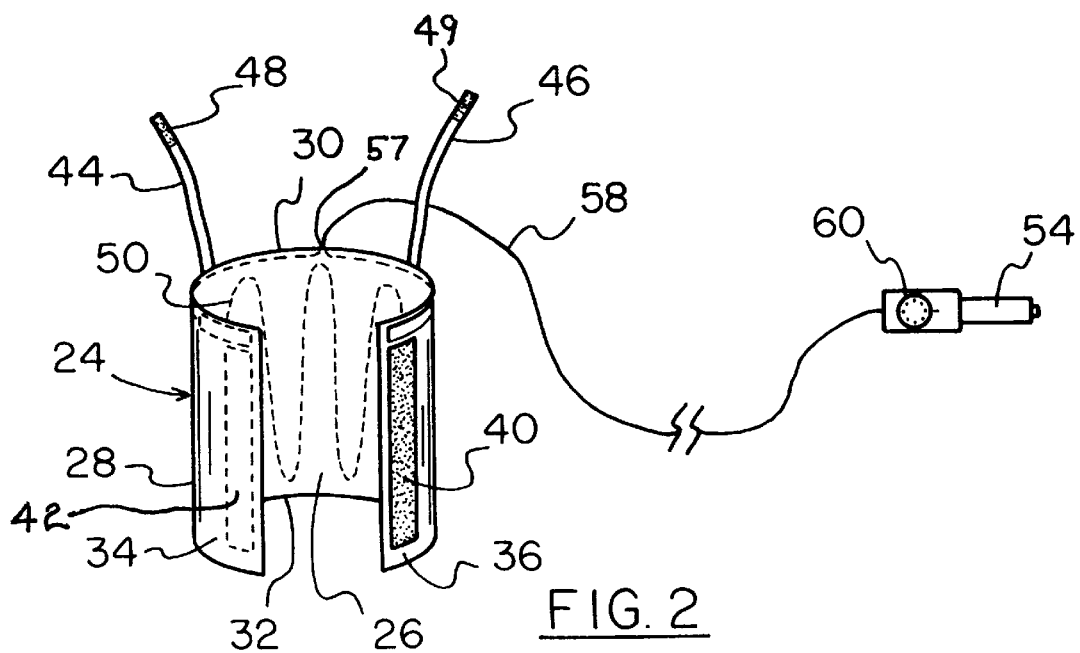
FIG. 2 is front perspective view of the invention.

FIG. 2 depicts blanket 24 with internal wiring 50 connected to cable 58 which is connected to adapter 54. Adapter 54 has dial 60 for adjusting the flow of current to blanket 24.

Blanket 24 further has outside surface 28 and inside surface 26, top edge 30 and bottom edge 32, first connecting end 34 and second connecting end 36. Blanket 24 also has first strap 44 and second strap 46. First strap 48 has velcro section 48 for engaging velcro section 49 on second strap 46. Blanket 24 has first securement area 34 having first securement area velcro fasteners 42 on the inside surface of first securement area 34 and second securement area 36 having second securement area velcro fasteners 40 on the outside surface of second securement area 36. Blanket 24 is affixed to filter 16 (FIG. 1) by wrapping blanket 24 around filter 16 snugly and engaging second securement area velcro fasteners 40 with first securement area velcro fasteners 42. First strap 44 and second strap 46 are secured by engaging velcro section 48 and velcro section 49 respectively. Alternatively, first strap 44 and second strap 46 can run over top 20 of filter 16 and engage outside velcro sections (not shown) on outer surface 28 of blanket 24. Internal wiring 50 runs up and down continuously within blanket 24 and the running ends of internal wiring 50 run parallel to top edge 30 of blanket 24 and exit blanket 24 at cable 20 connection 57. In the preferred embodiment, internal wiring 50 is a 12V heating element. Internal wiring 50 may exit and be covered so they continue in one unit in cable 58. Alternatively, internal wiring 50 may end at cable connection 57 so that cable 58 can be removed or attached to cable connection 57 as needed. Cable 58 connects to adapter 54. Adapter 54 has dial 60 for adjusting the flow of current to wiring 50 in blanket 24. When adapter 54 is placed in cigarette lighter 56 (FIG. 1) of truck 12 (FIG. 1) electrical current flows through cable 58 to wiring 50 which heats up inside blanket 24 and the heat is transmitted to filter 16 around which blanket 24 is wrapped (FIG. 1). The heat transmitted to filter 16 causes paraffin residue which has solidified in fuel in filter 16 to de-soldify, thereby reducing the risk of filter 16 clogging. Blanket 24 may be stored when not in use in the cab of truck 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed:

1. An apparatus for externally heating fuel in a fuel filter in an automotive vehicle having a cigarette lighter comprising:

internal wiring connected to a cable;

a blanket having a first securement area, a second securement area, an outside surface and an inside surface, said internal wiring being fixedly engaged between said outside surface and said inside surface;

a plurality of straps fixedly engaged to said blanket;

the cable connected to said internal wiring and to an adapter having a dial for adjusting a flow of current in said cable and said internal wiring; and wherein, when said blanket is wrapped around said fuel filter and said adapter is inserted into the cigarette lighter, heat is transmitted from said internal wiring through the blanket to the fuel filter so that paraffin residue which has solidified in said fuel in said fuel filter will de-solidify.

2. The blanket of claim 1 further comprising a cable connection wherein said cable is removably engaged to said internal wiring.

3. The internal wiring of claim 1 comprising a 12V heating element.

4. An apparatus for externally heating a fuel filter in an automotive vehicle having a cigarette lighter, fuel having a paraffin residue in said fuel filter and a firewall, said apparatus comprising:

internal wiring connected to a cable;

a blanket having an outside surface and an inside surface, said internal wiring being fixedly engaged between said outside surface and said inside surface;

a plurality of straps fixedly engaged to said blanket;

a first securement area velcro fastener and a second securement area velcro fastener fixedly engaged to said blanket;

the cable connected to said internal wiring; and wherein, when said blanket is wrapped around said fuel filter and said adapter is inserted into the cigarette lighter, heat is transmitted from said internal wiring through the blanket to the fuel filter;

wherein said first securement area velcro fasteners and said second securement area velcro fasteners engage to secure said blanket to said fuel filter;

wherein said heat causes the paraffin residue in said fuel filter to de-solidify; and wherein said firewall is adapted for passage of said cable and said cable is adapted for passage through said firewall.

* * * * *